United States Patent
Jales Costa et al.

(10) Patent No.: US 11,055,859 B2
(45) Date of Patent: *Jul. 6, 2021

(54) ECCENTRICITY MAPS

(71) Applicant: Ford Global Technologies, LLC, Dearborn, MI (US)

(72) Inventors: Bruno Sielly Jales Costa, Santa Clara, MI (US); Gintaras Vincent Puskorius, Novi, MI (US); Gaurav Kumar Singh, Westland, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 265 days.

This patent is subject to a terminal disclaimer.

(21) Appl. No.: 16/108,127

(22) Filed: Aug. 22, 2018

(65) Prior Publication Data
US 2020/0065980 A1   Feb. 27, 2020

(51) Int. Cl.
*G06T 7/11* (2017.01)
*G06T 7/254* (2017.01)
*G05D 1/02* (2020.01)

(52) U.S. Cl.
CPC .......... *G06T 7/254* (2017.01); *G05D 1/0238* (2013.01); *G06T 7/11* (2017.01); *G06T 2207/30261* (2013.01)

(58) Field of Classification Search
CPC .......... G06T 7/11; G06T 7/254; G05D 1/0238
See application file for complete search history.

(56) References Cited

U.S. PATENT DOCUMENTS

| | | | |
|---|---|---|---|
| 5,706,417 A | 1/1998 | Adelson | |
| 6,580,812 B1 | 6/2003 | Harrington | |
| 7,710,461 B2 | 5/2010 | Nagano et al. | |
| 9,171,390 B2 | 10/2015 | Sumner et al. | |
| 2002/0041339 A1 | 4/2002 | Diepold | |
| 2014/0218555 A1* | 8/2014 | Kuo | H04N 5/23216 348/220.1 |
| 2019/0114491 A1* | 4/2019 | Takaki | G06K 9/00805 |
| 2020/0053286 A1* | 2/2020 | Corona | H04N 5/23267 |

FOREIGN PATENT DOCUMENTS

WO   2016108847 A1   7/2016

* cited by examiner

*Primary Examiner* — Sam Bhattacharya
(74) *Attorney, Agent, or Firm* — Frank A. MacKenzie; Bejin Bieneman PLC

(57) ABSTRACT

A computing system can determine moving objects in a sequence of images based on recursively calculating red-green-blue (RGB) eccentricity 249 $_k$ based on a video data stream. A vehicle can be operated based on the determined moving objects. The video data stream can be acquired by a color video sensor included in the vehicle or a traffic infrastructure system.

20 Claims, 8 Drawing Sheets

ECCENTRICITY MAPS

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
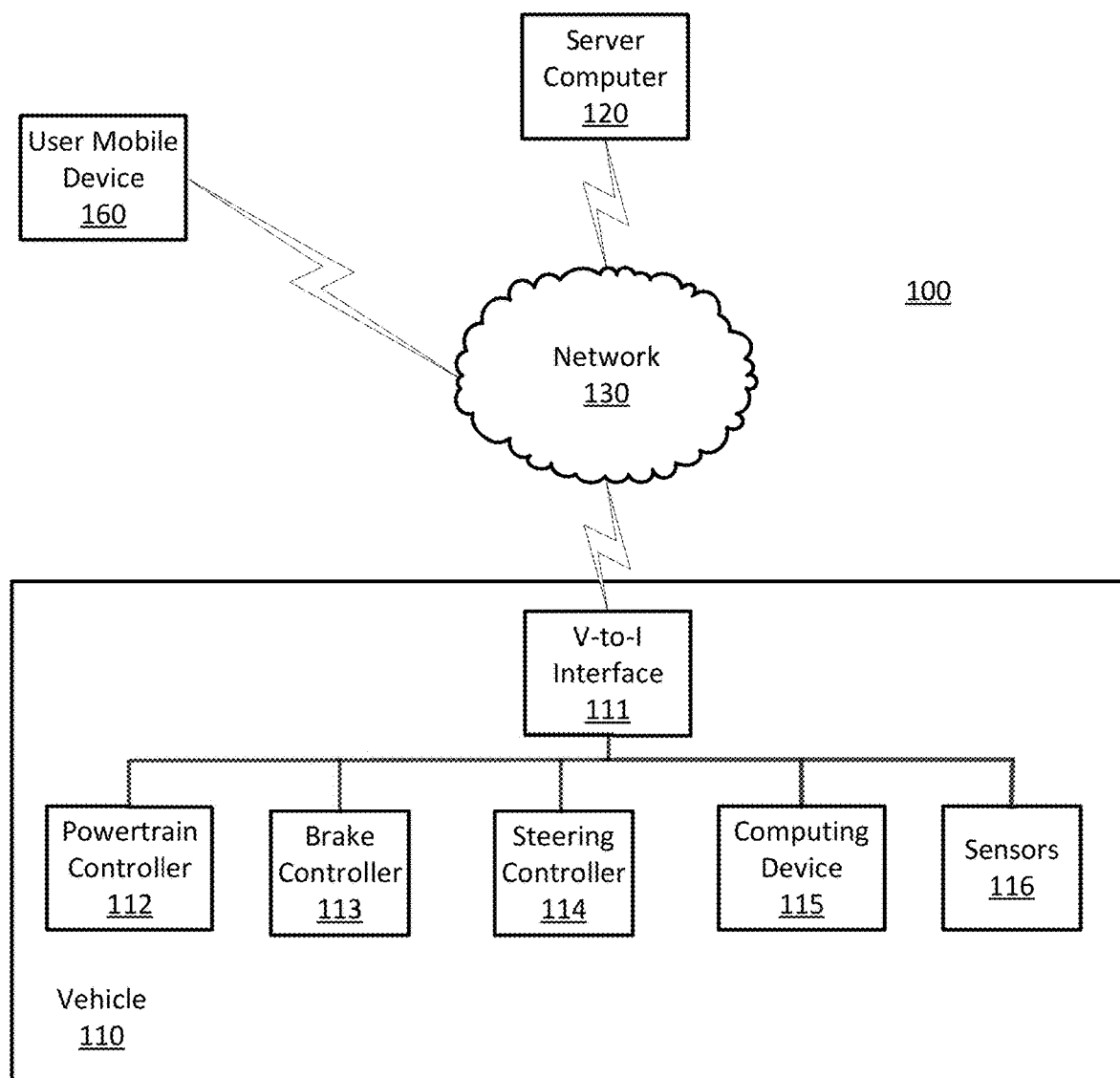
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of vehicle and to use the data to determine trajectories to be used to operate a vehicle in autonomous and semi-autonomous mode, for example, wherein the computing device can determine a vehicle path based on sensor data regarding roadway lanes and traffic, and operate the vehicle along the path at target vehicle speeds while keeping a minimum distance from other vehicles and avoiding pedestrians, cyclists etc. Based on sensor data, a computing device can determine moving objects including vehicles and pedestrians in the vicinity of a vehicle and operate a vehicle based on the moving objects. For example, a computing device can detect and identify moving objects in the vicinity of a vehicle and, based on detecting and identifying moving objects at a plurality of time periods, determine a velocity, including speed and direction, for the moving objects. Thus, the computing device enjoys improved accuracy in analyzing sensor, e.g., image, data, and in identifying and determining trajectories of, moving objects.

Disclosed herein is a method, including determining one or more moving objects in a sequence of images based on determining eccentricity $\varepsilon_k$ based on a video data stream and operating a vehicle based on the moving objects. Eccentricity $\varepsilon_k$ can be determined based on recursively updating a mean $\mu_k$ according to an equation $\mu_k = (1-\alpha)\mu_{k-1} + \alpha x_k$ where $\alpha$ is an empirically determined constant that assigns decreasing weights to older data points $x_k$ according to equation $W = [\alpha\ \alpha\ (1-\alpha)^{k-1}\ \alpha(1-\alpha)^{k-2}\ \ldots\ \alpha(1-\alpha)^{k-K+1}\ \ldots\ ]$. The eccentricity $\varepsilon_k$ can be determined based on recursively updated mean $\mu_k$ and recursively updated variance $\sigma_k^2$ according to approximation $$\varepsilon_k \approx \alpha + \frac{\alpha(x_k - \mu_k)^T(x_k - \mu_k)}{\sigma_k^2}.$$

The eccentricity $\varepsilon_k$ can be determined based on recursively updating a variance $\sigma_k^2$ for pixels of the sequence of images according to equation $$\sigma_k^2 = (1-\alpha)\sigma_{k-1}^2 + \frac{\alpha(x_k - \mu_k)^T(x_k - \mu_k)}{1-\alpha}.$$

The moving objects can be determined by comparing the eccentricity $\varepsilon_k$ to $\alpha$ times an empirically determined constant.

The moving objects can include gestures, pedestrians and vehicles. The moving objects in the video data stream can be determined based on determining connected regions of foreground pixels with empirically determined minimum and maximum areas. The video data stream can be acquired by a color video sensor included in the vehicle or a traffic infrastructure system. Moving objects in a sequence of images can be determined based on determining two or more eccentricity $\varepsilon_k$ images based on a video data stream. Projecting the moving objects onto a cognitive map can be determined based on the location of a color video camera that acquired the video data stream. Determining the cognitive map can be based on the location of the vehicle, map data, vehicle sensor data and the moving objects. Operating the vehicle can be based on a path polynomial based on the cognitive map. The color video camera can be included in the vehicle.

Further disclosed is a computer readable medium, storing program instructions for executing some or all of the above method steps. Further disclosed is a computer programmed for executing some or all of the above method steps, including a computer apparatus, programmed to determine one or more moving objects in a sequence of images based on determining eccentricity $\varepsilon_k$ based on a video data stream and operating a vehicle based on the moving objects. Eccentricity $\varepsilon_k$ can be determined based on recursively updating a mean $\mu_k$ according to an equation $\mu_k = (1-\alpha)\mu_{k-1} + \alpha x_k$ where $\alpha$ is an empirically determined constant that assigns decreasing weights to older data points $x_k$ according to equation $W = [\alpha\ \alpha\ (1-\alpha)^{k-1}\alpha(1-\alpha)^{k-2}\ \ldots\ \alpha(1-\alpha)^{k-K+1}\ \ldots\ ]$. The eccentricity $\varepsilon_k$ can be determined based on recursively updated mean $\mu_k$ and recursively updated variance $\sigma_k^2$ according to approximation $$\varepsilon_k \approx \alpha + \frac{\alpha(x_k - \mu_k)^T(x_k - \mu_k)}{\sigma_k^2}.$$

The eccentricity $\varepsilon_k$ can be determined based on recursively updating a variance $\sigma_k^2$ for pixels of the sequence of images according to equation $$\sigma_k^2 = (1-\alpha)\sigma_{k-1}^2 + \frac{\alpha(x_k - \mu_k)^T(x_k - \mu_k)}{1-\alpha}.$$

The computer apparatus can be further programmed to determine moving objects by comparing the eccentricity $\varepsilon_k$ to a times an empirically determined constant. The moving objects can include gestures, pedestrians and vehicles. The moving objects in the video data stream can be determined based on determining connected regions of foreground pixels with empirically determined minimum and maximum areas. The video data stream can be acquired by a color video sensor included in the vehicle or a traffic infrastructure system. Moving objects in a sequence of images can be determined based on determining two or more eccentricity $\varepsilon_k$ images based on a video data stream. Projecting the moving objects onto a cognitive map can be determined based on the location of a color video camera that acquired the video data stream. Determining the cognitive map can be based on the location of the vehicle, map data, vehicle sensor data and the moving objects. Operating the vehicle can be based on a path polynomial based on the cognitive map. The color video camera can be included in the vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
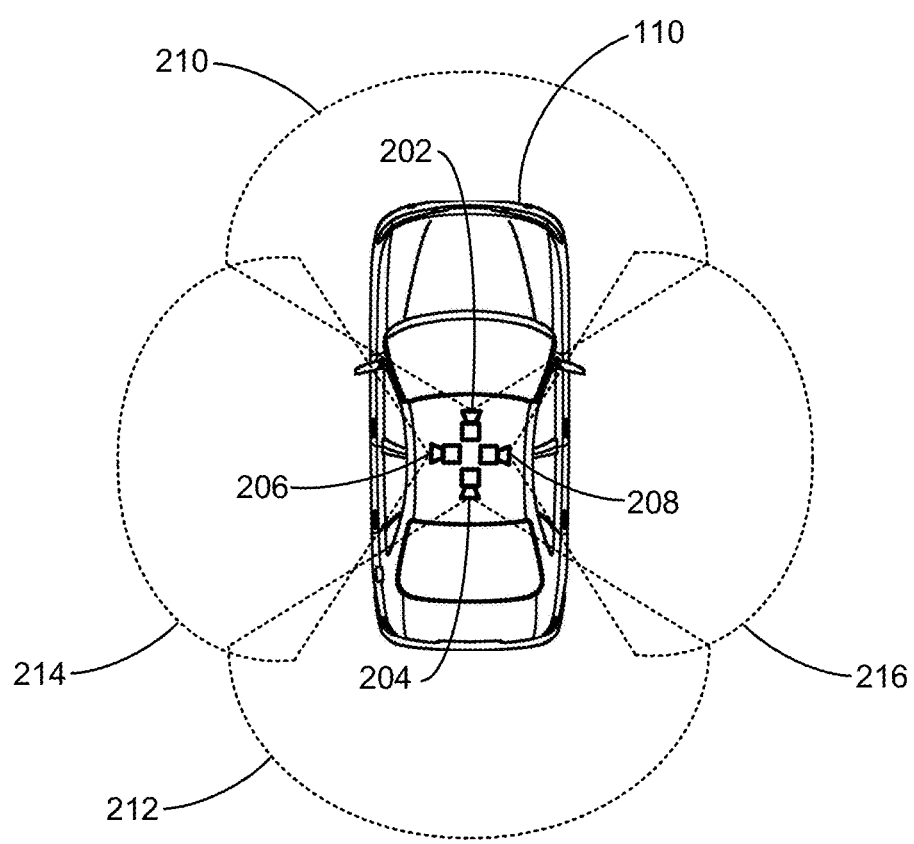
FIG. 2 is a diagram of an example vehicle with video sensors.

FIG. 2 is a diagram of an example vehicle 110 including video sensors 202, 204, 206, 208 each having a field of view 210, 212, 214, 216. Video sensors 202, 204, 206, 208 can provide video data to a computing device 115 in a vehicle 110 to detect moving objects in the vehicle's environment as represented by in the fields of view 210, 212, 214, 216 of video sensors 202, 204, 206, 208 using moving window eccentricity calculations as described herein. Detecting moving objects in the vehicle's environment can permit computing device 115 to determine vehicle paths that permit safe and efficient vehicle 110 operation by avoiding collisions and near collisions with moving objects.

Figure 3:
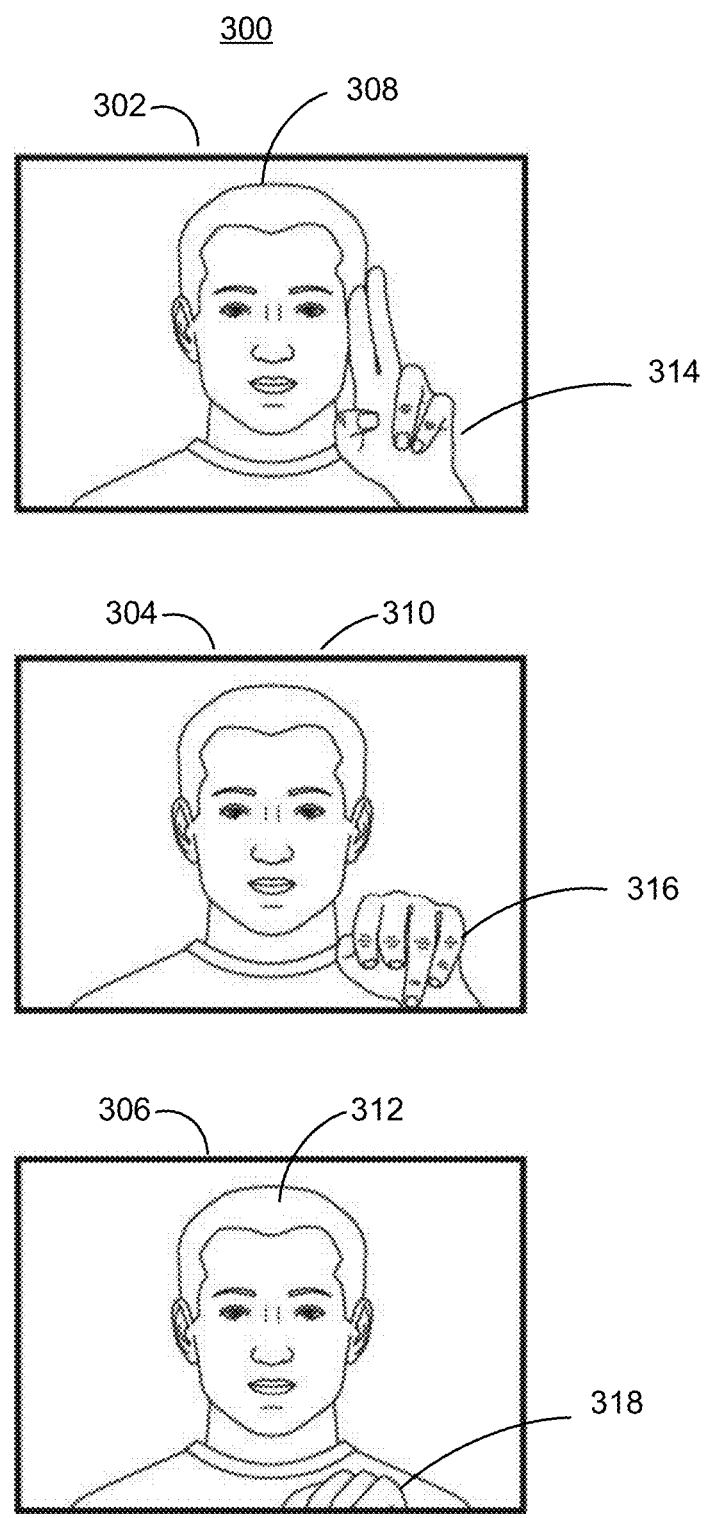
FIG. 3 is a diagram of an example video data sequence.

FIG. 3 is a diagram of three example frames of video data 302, 304, 306 from a stream of video data acquired by a video sensor included in a vehicle 110. For example, a video sensor can be included in an occupant cabin portion of a vehicle 110, positioned to include an occupant in its field of view. Visible in each frame of video data 302, 304, 306 is a person 308, 310, 312 and a person's hand 314, 316, 318. Although at least some portion of a person's hand 314, 316, 318 is visible in all three frames of video data 302, 304, 306, information included in all three frames of video data 302, 304, 306, e.g. changes in size, position and shape of person's hand 314, 316, 318, is required to detect and identify a hand gesture. Techniques discussed herein process video stream data to detect and identify moving objects in a field of view based on calculating a moving window eccentricity $\varepsilon$ image as described herein that is a static representation of object motion in video stream data including hand gestures.

Computing device 115 can use moving object data in a moving window eccentricity $\varepsilon$ image to recognize hand gestures using machine vision techniques including deep neural networks to determine an image of a person 314, 316, 318 in video stream data and relate sizes and shapes of a person's hand 314, 316, 318 as represented in moving window eccentricity $\varepsilon$ image data, to hand gesture semantics including vehicle commands. For example, a computing device 115 can identify a nearby pedestrian as a moving object based on a moving window eccentricity $\varepsilon$ image created by processing video stream data acquired by a video sensor 202, 204, 206, 208. Computing device 115 can determine that a nearby pedestrian is interested in obtaining transportation by determining that the nearby pedestrian is making a hand gesture, like hailing a taxi. In response to a pedestrian hand gesture, computing device 115 can operate vehicle 110 to move closer to the gesturing pedestrian and unlock a door, for example.

Figure 4:
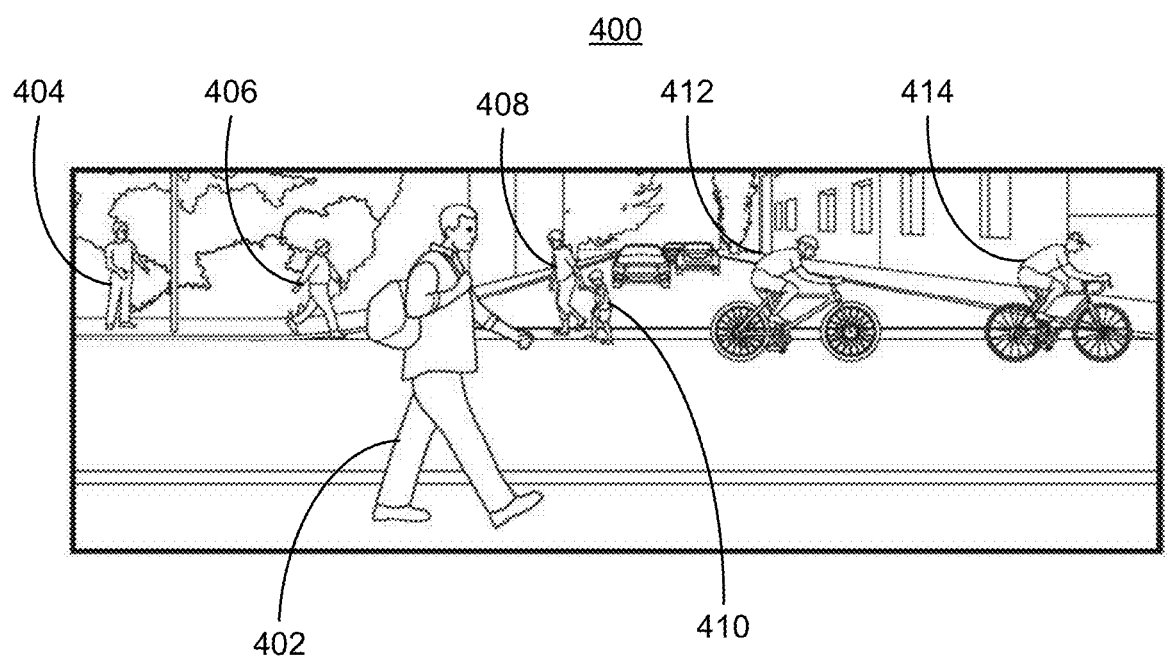
FIG. 4 is a diagram of an example video image.

FIG. 4 is an example color video image 400 of a traffic scene, rendered in black and white to comply with 37 C.F.R. § 1.84(a)(1). Color video image 400 can be acquired by a video sensor 202, for example, included in vehicle 110. This example color video image 400 can be included in video stream data that includes moving objects pedestrians 402, 404, 406, 408, 410 and cyclists 412, 414. Machine vision techniques including optical flow fields, warped optical flows and successive time difference calculations, for example, can be used to detect and identify moving objects in video stream data by applying finite and infinite response filters or filters with separable and non-separable spatio-temporal components to the video stream data. These techniques are computationally "expensive", in the sense that they require extensive computation that prevents their execution in real time. In addition, they may be highly sensitive to optimal choice of complex parameters, requiring tuning by experts to perform properly.

Discussed herein is a technique for static representation (eight-bit greyscale image) of apparent motion of objects, surfaces and edges visible in video stream data that can, typically much more efficiently than prior techniques, process hundreds of frames per second of video stream data on commonly available computing devices based on a video stream data metric called moving window eccentricity ε. Moving window eccentricity ε is a metric that measures how different a pixel data point is from past observations of the same pixel. For a set of pixels in an n-dimensional space, the value of moving window eccentricity ε for the set of pixels increases as the value of the pixels deviate from their "normal" behavior. Moving window eccentricity ε does not require complex user-defined parameters and does not require prior assumptions about the data and its statistical distribution and can be calculated at a rate of hundreds of frames of data per second, much faster than other techniques for determining image foreground. Calculation of moving window eccentricity ε is not susceptible to drift or concept evolution, where drift refers to slowly but persistently changing video stream data values and concept evolution refers to changes in parameters that determine the output is calculated over time. A calculated moving window eccentricity ε image output(i, j) can be input to computing tasks related to operating vehicle 110 including path planning and gesture recognition.

Figure 5:
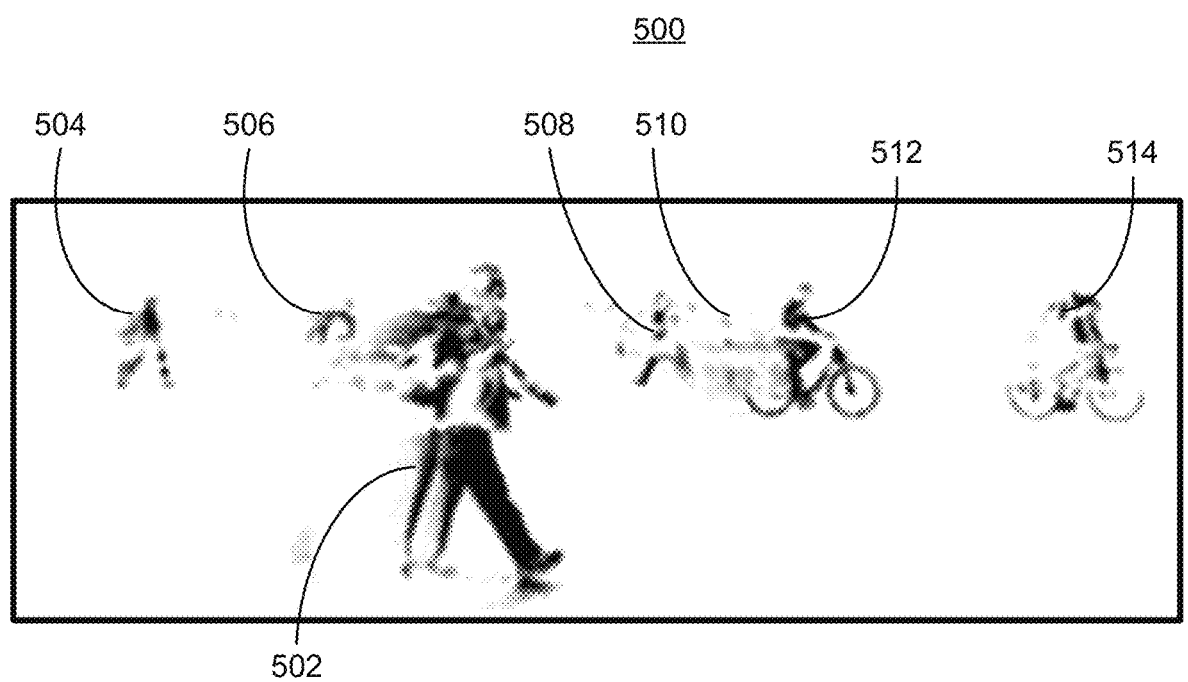
FIG. 5 is a diagram of an example eccentricity image.

FIG. 5 is a diagram of an example moving window eccentricity ε map 500. Moving window eccentricity ε image is calculated based on video stream data that includes frame of video data 400, for example. Video stream data is time series data, including a sequence of n-dimensional, equally spaced data observations, called frames. Each frame includes a height×width×3–n dimensional array of data points or pixels, where n can range from one, for greyscale or infrared data to three, for red, green, and blue (RGB) data points or pixels, for example. In a traditional (infinite memory) eccentricity ε calculation, the eccentricity $\varepsilon_k$ of a pixel at time instant k is based on a mean $\mu_k$ and a variance $\sigma_k^2$, where both $\mu_k$ and $\sigma_k^2$ are calculated based on all of the samples included since the time the calculations began, because each step in the calculation depends upon the values of variables from a previous step. Because eccentricity ε includes information from all previous samples, eccentricity ε computation has been limited to stationary video cameras, for example, where the field of view is expected to remain unchanged except for moving objects.

Eccentricity ε computation can be based on a moving window (finite memory) approach to recursive calculation of the eccentricity ε to adapt eccentricity ε for real-time processing of video data streams. The mean $\mu_k$ and a variance $\sigma_k^2$ are recursively updated for pixels $x_k$ at a time k by the equations:

$$\mu_k = (1-\alpha)\mu_{k-1} + \alpha x_k \quad (1)$$

$$\sigma_k^2 = (1-\alpha)\sigma_{k-1}^2 + \frac{\alpha(x_k - \mu_k)^T(x_k - \mu_k)}{1-\alpha} \quad (2)$$

where α is an empirically determined constant learning rate for the background model (=0.05). The constant α can be used to assign a set of exponentially decreasing weights to the pixels $x_k$:

$$w = [\alpha\ \alpha(1-\alpha)^{k-1}\ \alpha(1-\alpha)^{k-2}\ \ldots\ \alpha(1-\alpha)^{k-K+1}\ \ldots] \quad (3)$$

where the weight function W has unit sum. The weight function W forms a weighted average type aggregating operator with exponentially decreasing weights that depend upon α. The elements of W with power greater than K approach zero defining a moving window of width K. The width of moving window K is approximately reciprocal to a forgetting factor equal to K≈(1/α).

The expression for eccentricity ε can be defined for all data samples up to the time instant k. However, by introducing a constant learning rate, the effect of the older data points (beyond K) is essentially eliminated. Therefore, eccentricity ε can be expressed by the following approximation:

$$\varepsilon_k \approx \frac{1}{K} + \frac{(x_k - \mu_k)^T(x_k - \mu_k)}{K\sigma_k^2} \approx \alpha + \alpha\frac{(x_k - \mu_k)^T(x_k - \mu_k)}{\sigma_k^2} \quad (4)$$

For RGB video stream data, $x_k^{i,j} = \{R_k^{i,j}, G_k^{i,j}, B_k^{i,j}\}$, the vector containing the intensities of the red, green, and blue channels of a pixel (i, j) of an image with dimensions height×width×3, for example 1920×1080×3 bytes for high definition color video, at time instant k ("X" means "by" in the present descriptions). Each pixel (i,j) of the image generates an input vector $x_k^{i,j}$, resulting in height×width eccentricity ε outputs (the eccentricity ε of each pixel is independent from the other pixels, so each pixel is treated as a separate data stream). For each height×width×3 input image (RGB), we can generate a height×width×1 eccentricity ε map 500 (1920×1080×8-bit gray scale, for example).

Examination of eccentricity ε map 500 reveals detected moving objects 502, 504, 506, 508, 510, 512, 514 generated by processing video stream data that includes video image 400, for example. Eccentricity ε map 500 can be based on a limited number, e.g., 20, frames of video stream data. Motion of images of pedestrians 402, 404, 406, 408, 410 and cyclists 412, 414 in video stream data are converted into 8-bit greyscale representations of moving objects 502, 504, 506, 508, 510, 512, 514. Direction of motion of moving objects can be inferred from the direction of horizontal dark lines that indicate motion from left to right, or right to left for moving objects 502, 504, 506, 508, 510, 512, 514 in eccentricity ε map 500 and therefore traffic scene in video image 400, for example. The speed of moving objects can be proportional to the length of the horizontal lines included in moving objects 502, 504, 506, 508, 510, 512, 514, where higher speed objects have longer horizontal length in eccentricity ε map 500. A plurality of eccentricity ε maps 500 can be acquired at successive time instants and locations of moving objects 502, 504, 506, 508, 510, 512, 514 can be tracked and velocities of moving objects 502, 504, 506, 508, 510, 512, 514 can be determined by plotting change in location in space vs. time.

Figure 6:
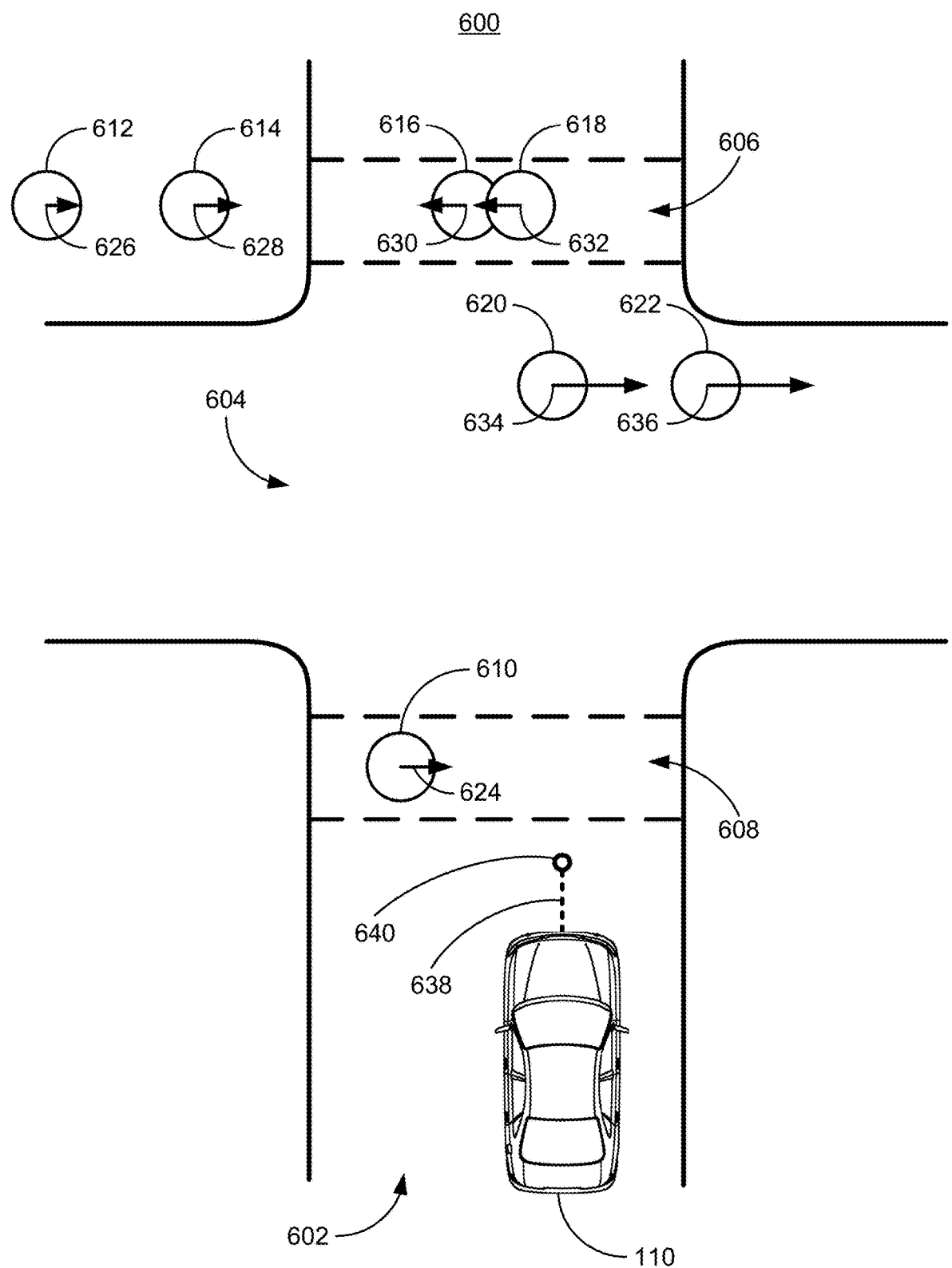
FIG. 6 is a diagram of an example cognitive map with moving objects.

FIG. 6 is an example cognitive map 600 determined by computing device 115 in vehicle 110 based on a eccentricity $\varepsilon_k$ map 500 and 3D location data generated by vehicle sensors 116. A cognitive map is defined as a representation of a local spatial environment. In this example cognitive map 600 is a top-down (map) view of a local spatial environment that includes regions and objects relevant to vehicle 110 navigation including a roadway 602, and an intersection 604 including crosswalks 606, 608, denoted by dashed lines. Information to construct a cognitive map can come from map information stored at computing device 115 or downloaded from a server via V-to-I interface 111. Map information can be combined with information from vehicle sensors 116 including video sensors, lidar sensors and location sensors including GPS and accelerometers. This information can be combined to construct the cognitive map 600 and correctly position vehicle 110 in it. Cognitive map 600 can be constructed based on real world 3D coordinates. Real world 3D coordinates of moving objects 502, 504, 506, 508, 510, 512, 514 with respect to real world coordinates of vehicle 110 can be determined based on analysis of moving objects 502, 504, 506, 508, 510, 512, 514 using machine vision techniques to determine connected regions of pixels associated with each moving object 502, 504, 506, 508, 510, 512, 514 and then calculate statistical measures of the connected regions including size, bounding box, width/height ratio, etc. The statistical measures related to connected regions can be analyzed to estimate real world 3D distance from vehicle 110 to moving objects 502, 504, 506, 508, 510, 512, 514 based on assumptions regarding average size and motion of pedestrians and cyclists and identifying a connected region as pedestrians, cyclists, or vehicle, for example. Using estimated 3D distances, computing device 115 can place moving objects 502, 504, 506, 508, 510, 512, 514 into cognitive map 600 as mapped moving objects 610, 612, 614, 616, 618, 620, 622 based on their estimated 3D location with respect to vehicle 110.

Vehicle sensors 116 can be used to determine 3D distance of moving objects 502, 504, 506, 508, 510, 512, 514 from vehicle 110 in real world coordinates. For example, computing device 115 can query lidar data to determine the 3D distance from vehicle to locations in the lidar sensor field of view corresponding to moving objects 502, 504, 506, 508, 510, 512, 514 based on the location of the moving objects 502, 504, 506, 508, 510, 512, 514 in the field of view of video sensor 202. Computing device can also use video to determine 3D distance to moving objects 502, 504, 506, 508, 510, 512, 514 including optical flow techniques and neural networks, by processing an input color video data stream to extract 3D distances from the video sensor 202 to portions of the field of view. Because moving objects 502, 504, 506, 508, 510, 512, 514 were acquired based on the same field of view, 3D distances of the portions of the field of view corresponding to moving objects 502, 504, 506, 508, 510, 512, 514 can determine a 3D distance to each moving object 502, 504, 506, 508, 510, 512, 514. Using these techniques, computing device 115 can determine 3D distances to the moving objects from vehicle 110, and based on the real world 3D location of vehicle 110, place moving objects 502, 504, 506, 508, 510, 512, 514 into cognitive map 600 as mapped moving objects 610, 612, 614, 616, 618, 620, 622 based on their determined 3D location with respect to vehicle 110.

By tracking mapped moving objects 610, 612, 614, 616, 618, 620, 622 in a plurality of eccentricity $\varepsilon_k$ maps 500 acquired at successive time instants, a speed and direction can be determined for each mapped moving object 610, 612, 614, 616, 618, 620, 622. The location, speed and direction of the mapped moving objects 610, 612, 614, 616, 618, 620, 622 can indicated by arrows 624, 626, 628, 630, 632, 634, 636 on each mapped moving object 610, 612, 614, 616, 618, 620, 622 that indicate direction of motion and speed by the length and direction of the arrow.

Computing device 115 can determine a path polynomial 638 (dotted line) in cognitive map 600 that permits vehicle 110 to travel to a destination while avoiding collision or near-collision with mapped moving objects 610, 612, 614, 616, 618, 620, 622 by estimating free space regions and non-free space regions included in cognitive map 600. Free space regions are regions of a cognitive map 600 in which a vehicle 110 can be predicted to travel unimpeded on a roadway surface. Computing device 115 can determine destinations in cognitive map 600 for vehicle 110 travel that will be a step in accomplishing a higher level goal-directed activity like picking up a passenger and dropping them at a destination, for example. Non-free space regions included in a cognitive map 600 can include non-roadway regions and regions surrounding objects, both fixed objects like traffic cones and barriers, and, when objects are determined to be moving, locations to which the objects are likely to move, for example predicting travel for vehicles, pedestrians and cyclists as indicated by arrows 624, 626, 628, 630, 632, 634, 636 on mapped moving objects 610, 612, 614, 616, 618, 620, 622. Locations in a cognitive map 500 to which the mapped moving objects 610, 612, 614, 616, 618, 620, 622 are likely to move can be determined based on repeated observations of the mapped moving objects 610, 612, 614, 616, 618, 620, 622 over time, for example, to determine mapped moving object 610, 612, 614, 616, 618, 620, 622 location probabilities based on determined speed and direction indicated by arrows 624, 626, 628, 630, 632, 634, 636. Path polynomials can be determined to direct vehicle 110 to travel within a free space region to reach a destination while avoiding non-free space regions.

A path polynomial is a mathematical representation of real world 3D location and motion including rates of change of lateral and longitudinal accelerations, for example. Computing device 115 can determine a path polynomial based on predicted locations, speed and direction for vehicle 110. Computing device can then determine a polynomial function of degree three or less in segments called splines, wherein the segments are constrained to fit smoothly together by constraints on first derivatives to represent predicted successive locations of vehicle 110. Constraints on a path polynomial in real world 3D coordinates include upper and lower limits on lateral and longitudinal accelerations and upper limits on rates of change of lateral and longitudinal accelerations (jerk) required to operate vehicle 110 along path polynomial. Path polynomial can be constrained to stay in a roadway and to avoid moving objects while moving toward a destination by constraining a path polynomial to a free space region. Computing device 115 can operate vehicle 110 to travel along a path polynomial by sending commands to controllers 112, 113, 114 to control steering, brakes and powertrain of vehicle 110 to cause vehicle 110 to travel along path polynomial on a roadway while avoiding moving objects. In this example computing device 115 has determined path polynomial 634 to operate vehicle 110 on roadway 602 at intersection 604 while avoiding mapped moving objects 610, 612, 614, 616, 618, 620, 622. Path polynomial 634 ends in an open circle 636, meaning that vehicle 110 will stop at the location indicated by the open circle 636 on path polynomial 634 until information regarding mapped moving objects 610, 612, 614, 616, 618, 620, 622 based on an eccentricity $\varepsilon$ map 500 indicates that intersection 604 is clear of mapped moving objects 610, 612, 614, 616, 618, 620, 622. At this time computing device 115 can determine a new path polynomial along which to operate vehicle 110.

Figure 7:
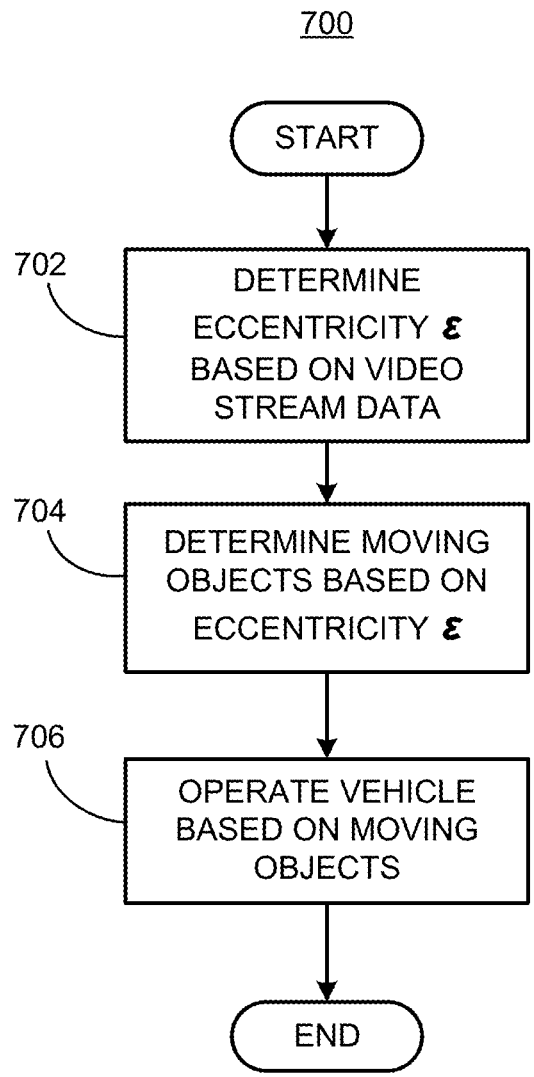
FIG. 7 is a flowchart diagram of an example process to operate a vehicle based on moving objects.

FIG. 7 is a diagram of a flowchart, described in relation to FIGS. 1-6, of a process 700 for operating a vehicle based on operating a vehicle based on determining moving objects based on video stream data. Process 700 can be implemented by a processor of computing device 115, taking as input information from sensors 116, and executing commands and sending control signals via controllers 112, 113, 114, for example. Process 700 includes multiple blocks taken in the disclosed order. Process 700 also includes implementations including fewer blocks or can include the blocks taken in different orders.

Figure 8:
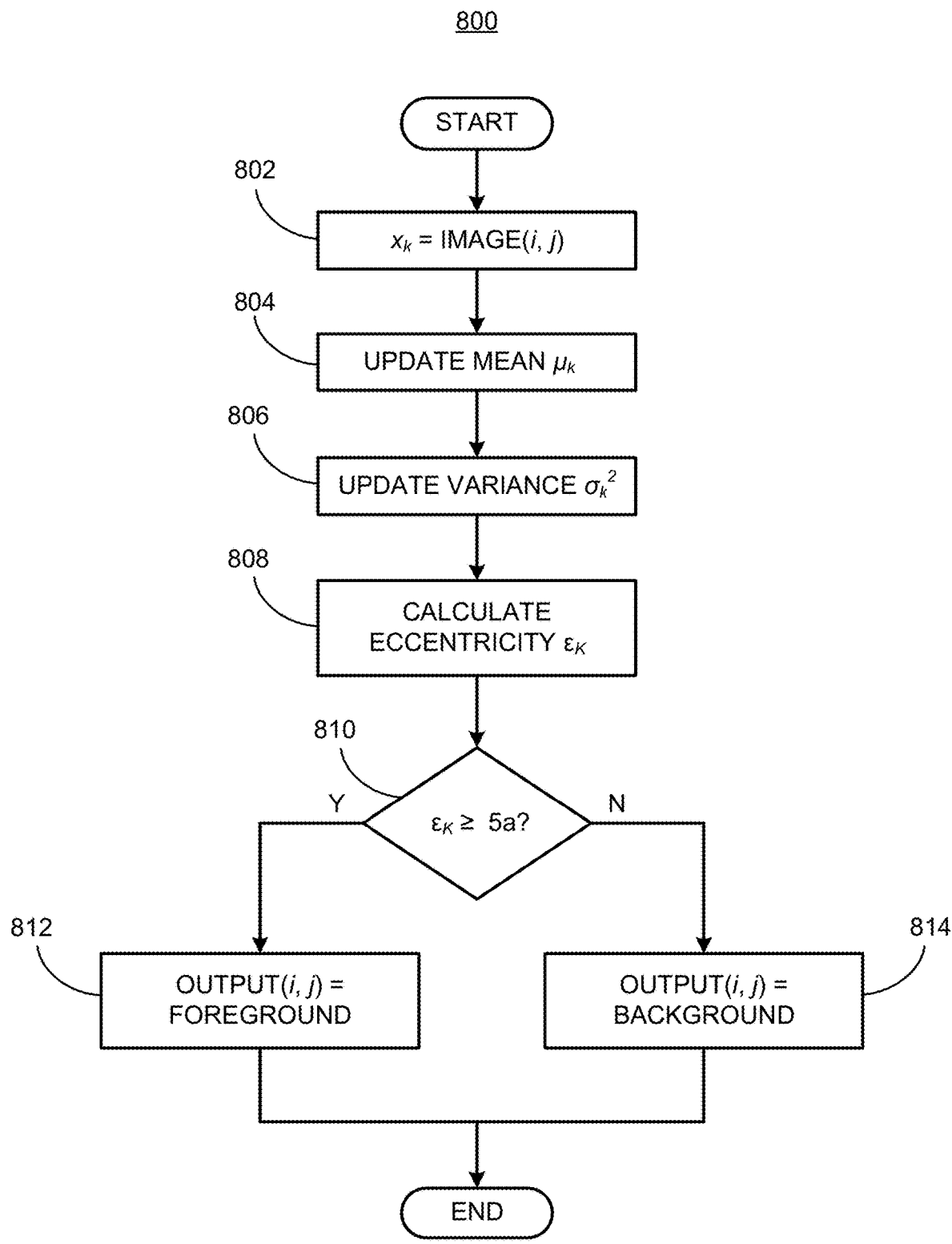
FIG. 8 is a flowchart diagram of an example process to calculate an eccentricity image.

Process 700 begins at block 702, wherein a computing device 115 included in a vehicle 110 can determine moving window eccentricity ε based on video stream data as discussed above in relation to FIG. 5, equation (4), above, and as described in more detail by process 800 of FIG. 8. Moving window eccentricity ε is a metric that can be applied to video stream data by computing device 115 to create a static representation of motion in video stream data that can represent movement in video stream data by including foreground pixels determined by their difference from a mean and variance based on a video stream data limited to a fixed number of samples. Foreground pixels in moving window eccentricity ε image 500 represent moving objects including pedestrians, vehicles, cyclists, and hand gestures in video stream data. Computing device 115 can calculate moving window eccentricity ε images 500 at a rate of several hundred frames per second, much faster than other techniques for detecting moving objects can perform.

At block 704 computing device 115 can determine 3D distances to moving objects 502, 504, 506, 508, 510, 512, 514 in moving window eccentricity ε image 500 based on determining statistical measures of connected regions representing the moving objects 502, 504, 506, 508, 510, 512, 514 as discussed above in relation to FIG. 6. The location, size and shape of connected regions representing moving objects 502, 504, 506, 508, 510, 512, 514 can be processed by computing device 115 to determine the 3D location of the moving objects 502, 504, 506, 508, 510, 512, 514 in 3D space relative to a video sensor 202, 204, 206, 208 based on assumptions regarding the size, shape and expected locations of the moving objects 502, 504, 506, 508, 510, 512, 514. Computing device 115 can use the 3D distance information to place moving objects 502, 504, 506, 508, 510, 512, 514 in a cognitive map that describes portions of an environment near a vehicle from a top-down (map) perspective.

3D distances to moving objects 502, 504, 506, 508, 510, 512, 514 can additionally be based on determining 3D distances to moving objects 502, 504, 506, 508, 510, 512, 514 based on information from vehicle sensors 116 including radar, lidar, and video sensors, as discussed above in relation to FIG. 6. This 3D distance information is in addition to the 3D distance information based on processing moving window eccentricity ε image 500 and represents a redundant check on both sources of 3D distance information.

At block 706, computing device 115 can operate a vehicle 110 based on the cognitive map including mapped moving objects 602, 604, 606, 608, 610, 612, 614 as discussed above in relation to FIG. 6. Computing device can determine a location and direction and speed of motion for mapped moving objects 610, 612, 614, 616, 618, 620, 622 and determine a path polynomial 634 for operating vehicle 110 on a roadway 502 based on a location and direction and speed of motion of mapped moving objects 602, 604, 606, 608, 610, 612, 614 that avoids collisions or near-collisions between vehicle 110 and mapped moving objects 602, 604, 606, 608, 610, 612, 614. Computing device can then command vehicle 110 steering, brakes, and powertrain to operate vehicle 110 along a path polynomial 634. Following this block process 700 ends.

FIG. 8 is a diagram of a flowchart, described in relation to FIGS. 1-6, of a process 800 for determining moving window eccentricity ε based on video stream data. Process 800 can be implemented by a processor of computing device 115, taking as input information from sensors 116, and executing commands and sending control signals via controllers 112, 113, 114, for example. Process 800 includes multiple blocks taken in the disclosed order. Process 800 also includes implementations including fewer blocks or can include the blocks taken in different orders.

Process 800 begins at block 802, where a computing device 115 in a vehicle 110, where a pixel $x_k$ is selected from a frame of video stream data image(i, j) at time instant k. The pixels $x_k$ of a frame of video stream data at time instant k can be processed in raster scan order, where rows i are scanned before columns j, for example.

At block 804, computing device 115 updates mean $\mu_k$ at time instant k according to equation (1), above. The mean $\mu_k$ update is calculated recursively to include only the previous K samples, where K can be a small number, for example 20.

At block 806, computing device 115 updates variance $\sigma_k^2$ at time instant k according to equation (2), above. The variance $\sigma_k^2$ update is calculated recursively to include only the previous K samples, where K can be a small number, for example 20.

At block 808, computing device 115 calculates moving window eccentricity $\varepsilon_k$ at time instant k according to equation (4), above. The moving window eccentricity $\varepsilon_k$ update is calculated recursively to include only the previous K samples, where K can be a small number, for example, 20.

At block 810 computing device compares moving window eccentricity $\varepsilon_k$ update calculated at block 808 to a number equal to five times an empirically determined constant α. If moving window eccentricity $\varepsilon_k$ is greater than or equal to 5α, process 800 branches to block 812. If moving window eccentricity is less than 5α, process 800 branches to block 814.

At block 812 computing device sets a pixel of an output image at location output(i, j) equal to a value that represents foreground and thereby moving object. Process 800 is repeated until all pixels of output(i, j) have been set in raster scan order, and then process 800 ends.

At block 814 computing device sets a pixel of an output image at location output(i, j) equal to a value that represents background and thereby a stationary or non-moving object. Process 800 is repeated until all pixels of output(i, j) have been set in raster scan order, and then process 800 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining one or more moving objects in a sequence of images based on recursively calculating red-green-blue (RGB) eccentricity $\varepsilon_k$ based on a video data stream; and
   operating a vehicle based on the moving objects.

2. The method of claim 1, further comprising determining eccentricity $\varepsilon_k$ based on recursively updating a mean $\mu_k$ according to an equation $\mu_k=(1-\alpha)\mu_{k-1}+\alpha x_k$ where $\alpha$ is an empirically determined constant that assigns decreasing weights to older data points $x_k$ according to equation $$W=[\alpha \; \alpha(1-\alpha)^{k-1} \alpha(1-\alpha)^{k-2} \ldots \alpha(1-\alpha)k-K+1 \ldots ].$$

3. The method of claim 2, further comprising determining the eccentricity $\varepsilon_k$ based on recursively updating a variance $\sigma_k^2$ for pixels of the sequence of images according to equation $$\sigma_k^2 = (1-\alpha)\sigma_{k-1}^2 + \frac{\alpha(x_k-\mu_k)^T(x_k-\mu_k)}{1-\alpha}.$$

4. The method of claim 3, further comprising determining the eccentricity $\varepsilon_k$ based on recursively updated mean $\sigma_k^2$ and recursively updated variance $\sigma_k^2$ according to approximation $$\varepsilon_k \approx \alpha + \frac{\alpha(x_k-\mu_k)^T(x_k-\mu_k)}{\sigma_k^2}.$$

5. The method of claim 4, further comprising determining the moving objects by comparing the eccentricity $\varepsilon_k$ to $\alpha$ times an empirically determined constant.

6. The method of claim 1, wherein the moving objects include gestures, pedestrians and vehicles.

7. The method of claim 1, further comprising determining moving objects in the video data stream based on determining connected regions of foreground pixels with empirically determined minimum and maximum areas.

8. The method of claim 1, wherein the video data stream is acquired by a color video sensor included in the vehicle or a traffic infrastructure system.

9. The method of claim 1, further comprising determining moving objects in a sequence of images based on determining two or more eccentricity $\varepsilon_k$ images based on a video data stream.

10. A system, comprising a processor; and
    a memory, the memory including instructions to be executed by the processor to:
      determine one or more moving objects in a sequence of images based on recursively calculating red-green-blue (RGB) eccentricity $\varepsilon_k$ based on a video data stream; and
      operate a vehicle based on the moving objects.

11. The system of claim 10, further comprising determining eccentricity $\varepsilon_k$ based on determining a mean $\mu_k$ for pixels of the video data stream, based on recursively updating mean $\mu_k$ according to equation $\mu_k=(1-\alpha)\mu_{k-1}+\alpha x_k$ where $\alpha$ is an empirically determined constant that assigns decreasing weights to older data points $x_k$ according to equation $W=[\alpha \; \alpha(1-\alpha)^{k-1}\alpha(1-\alpha)^{k-2} \ldots \alpha(1-\alpha)^{k-K+1} \ldots ].$ 12. The system of claim 11, further comprising determining the eccentricity $\varepsilon_k$ based on determining a variance $\sigma_k^2$ for RGB pixels of the sequence of images, based on recursively updating variance $\sigma_{k-1}^2$ according to equation $$\sigma_k^2 = (1-\alpha)\sigma_{k-1}^2 + \frac{\alpha(x_k-\mu_k)^T(x_k-\mu_k)}{1-\alpha}.$$

13. The system of claim 12, further comprising determining the eccentricity $\varepsilon_k$ based on mean $\mu_k$ and variance $\sigma_k^2$ according to approximation $$\varepsilon_k \approx \alpha + \frac{\alpha(x_k-\mu_k)^T(x_k-\mu_k)}{\sigma_k^2}.$$

14. The system of claim 13, further comprising determining the moving objects by comparing the eccentricity $\varepsilon_k$ to $\alpha$ times an empirically determined constant.

15. The system of claim 10, wherein the moving objects include gestures, pedestrians and vehicles.

16. The system of claim 10, further comprising determining moving objects in the video data stream based on determining connected regions of foreground pixels with empirically determined minimum and maximum areas.

17. The system of claim 10, wherein the video data stream is acquired by a color video sensor included in the vehicle or a traffic infrastructure system.

18. The system of claim 10, further comprising determining moving objects in a sequence of images based on recursively calculating two or more eccentricity $\varepsilon_k$ images based on a video data stream.

19. A system, comprising:
   means for controlling vehicle steering, braking and powertrain;
   computer means for:
      determining moving objects in a sequence of images based on determining recursively calculating red-green-blue (RGB) eccentricity $\varepsilon_k$ based on a video data stream; and
      operating a vehicle based on the moving objects and means for controlling vehicle steering, braking and powertrain.

20. The system of claim 19, further comprising determining eccentricity $\varepsilon_k$ based on recursively updating a mean $\mu_k$ according to equation $\mu_k = (1-\alpha)\mu_{k-1} + \alpha x_k$ where $\alpha$ is an empirically determined constant that assigns decreasing weights to older data points $x_k$ according to equation $$W = [\alpha\ \alpha(1-\alpha)^{k-1} \alpha(1-\alpha)^{k-2} \ldots \alpha(1-\alpha)k-K+1 \ldots].$$

* * * * *